United States Patent [19]

Wendell

[11] 4,224,864
[45] Sep. 30, 1980

[54] APPARATUS FOR COOKING MEAT PATTIES AND THE LIKE

[76] Inventor: Russell C. Wendell, 16262 Tisbury Cir., Huntington Beach, Calif. 92649

[21] Appl. No.: 957,319

[22] Filed: Nov. 2, 1978

Related U.S. Application Data

[60] Division of Ser. No. 724,571, Sep. 20, 1976, abandoned, which is a continuation of Ser. No. 624,583, Oct. 22, 1975, abandoned.

[51] Int. Cl.³ ............................................. A47J 37/12
[52] U.S. Cl. ...................................... 99/349; 99/355; 99/407; 99/416; 99/423; 100/266; 100/292; 100/194
[58] Field of Search ................. 99/349, 355, 410, 415, 99/416, 417, 422, 423, 448, 449, 407; 100/DIG. 10, 266, 292, 194, 195; 426/438

[56] References Cited

U.S. PATENT DOCUMENTS

| 797,660 | 8/1905 | Brooks | 99/417 X |
|---|---|---|---|
| 1,025,630 | 5/1912 | Von Krogoll | 99/417 X |
| 1,986,115 | 1/1935 | Offenhauser | 99/349 |
| 2,031,259 | 2/1936 | Fox | 99/349 X |
| 2,191,275 | 2/1940 | Fink | 99/349 |
| 2,244,145 | 6/1941 | Erickson | 99/349 |
| 2,652,768 | 9/1953 | Moreno | 99/448 X |
| 3,155,030 | 11/1964 | Curtis | 100/194 |
| 3,534,677 | 10/1970 | Keathley | 99/448 X |
| 3,555,993 | 1/1971 | Garcia | 99/448 X |
| 3,759,165 | 9/1973 | Wallace | 99/448 |

*Primary Examiner*—Billy J. Wilhite
*Attorney, Agent, or Firm*—Romney, Schaap, Golant, Disner & Ashen

[57] ABSTRACT

Apparatus for cooking meat patties and the like including a pair of opposing heat transfer plates having inner cooking faces for holding the patties therebetween and an outer heat receptor portion for receiving heat such as from the surrounding fat in a deep-fat cooker. Securing the plates a predetermined distance apart corresponding to the thickness of the meat pattie. Adjustably connecting the plates together to compress the uncooked meat pattie and/or to compress the meat pattie as it is being cooked. Providing a stack of heat transfer plates which form a series of vertically spaced compartments, with alternate compartments being used for holding a meat pattie, and the interstitial compartments receiving the heat source medium such as fat.

10 Claims, 7 Drawing Figures

U.S. Patent Sep. 30, 1980 Sheet 1 of 3 4,224,864
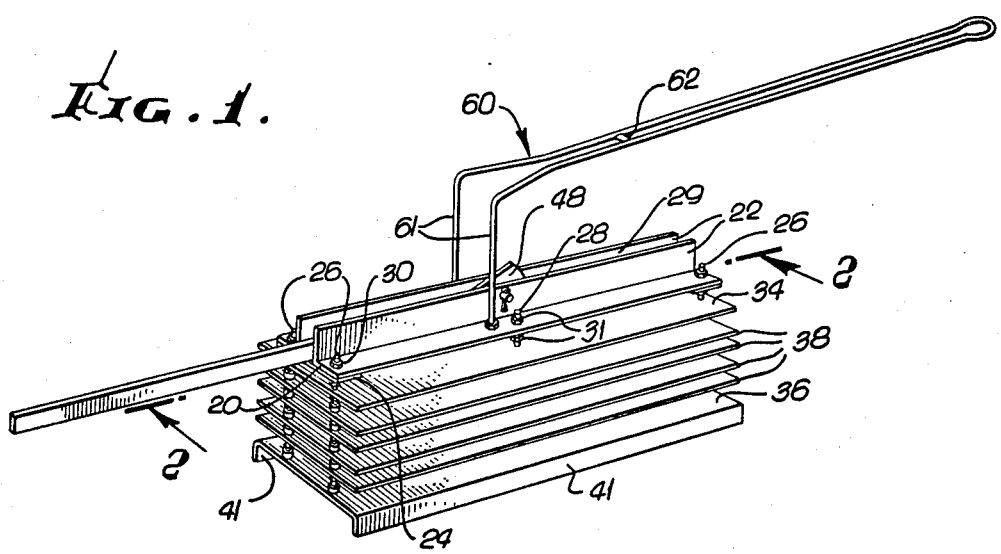
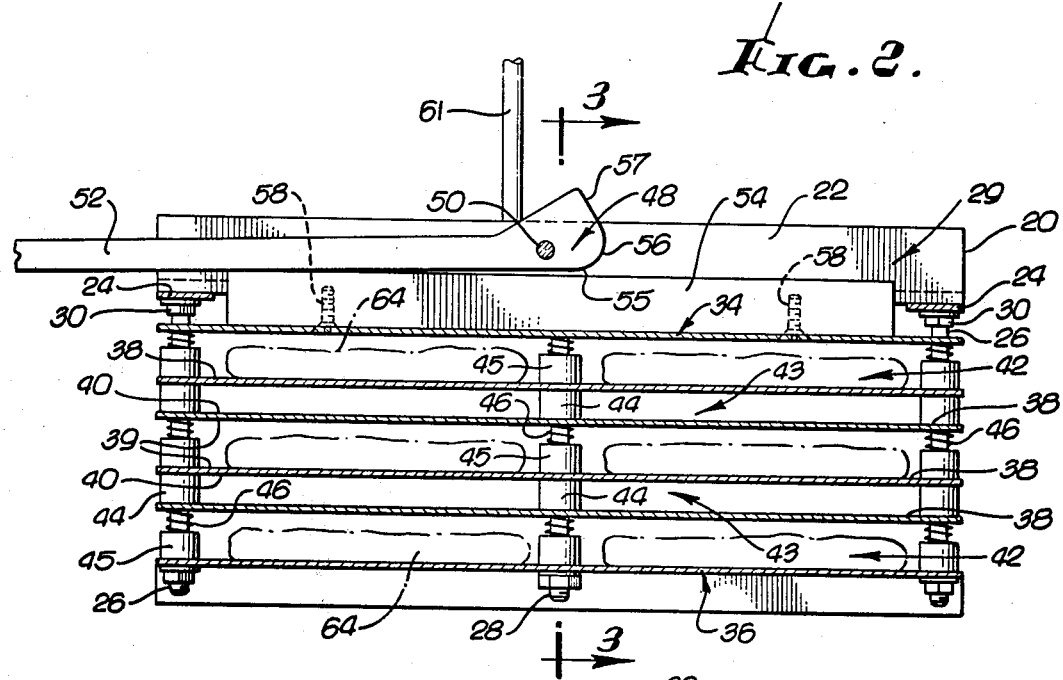
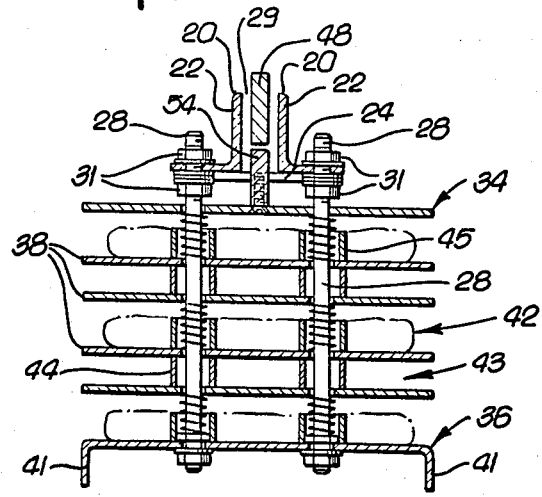

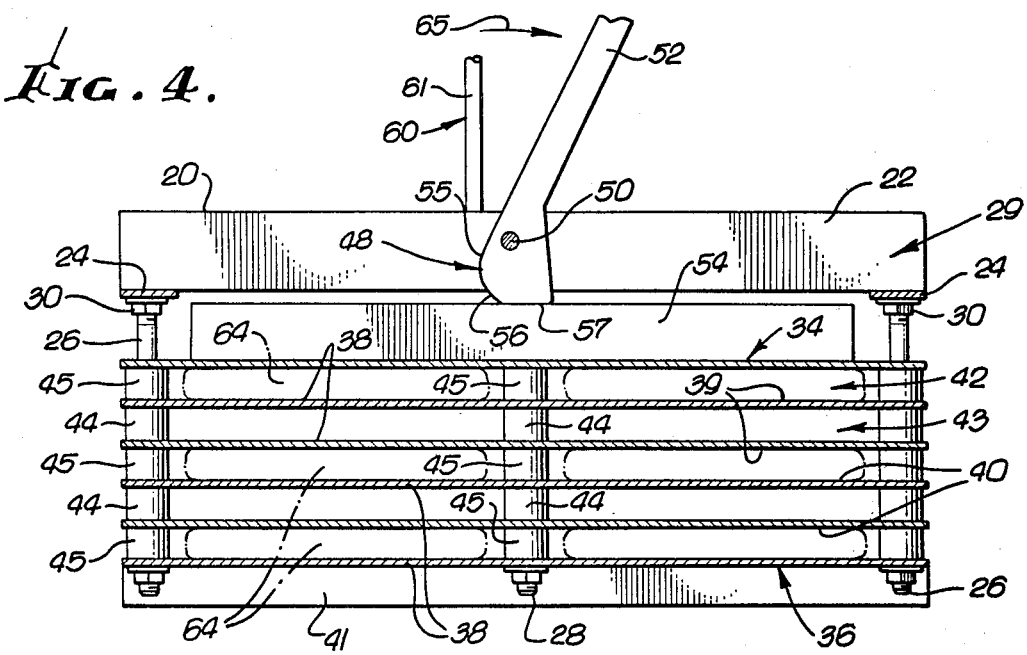
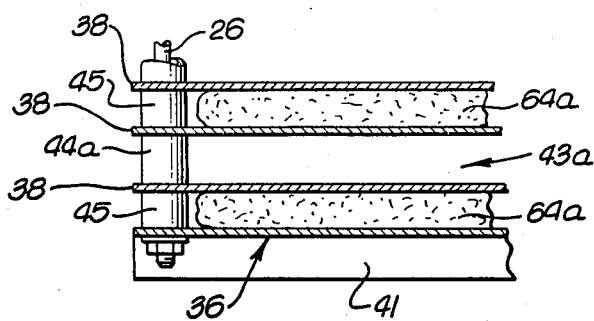
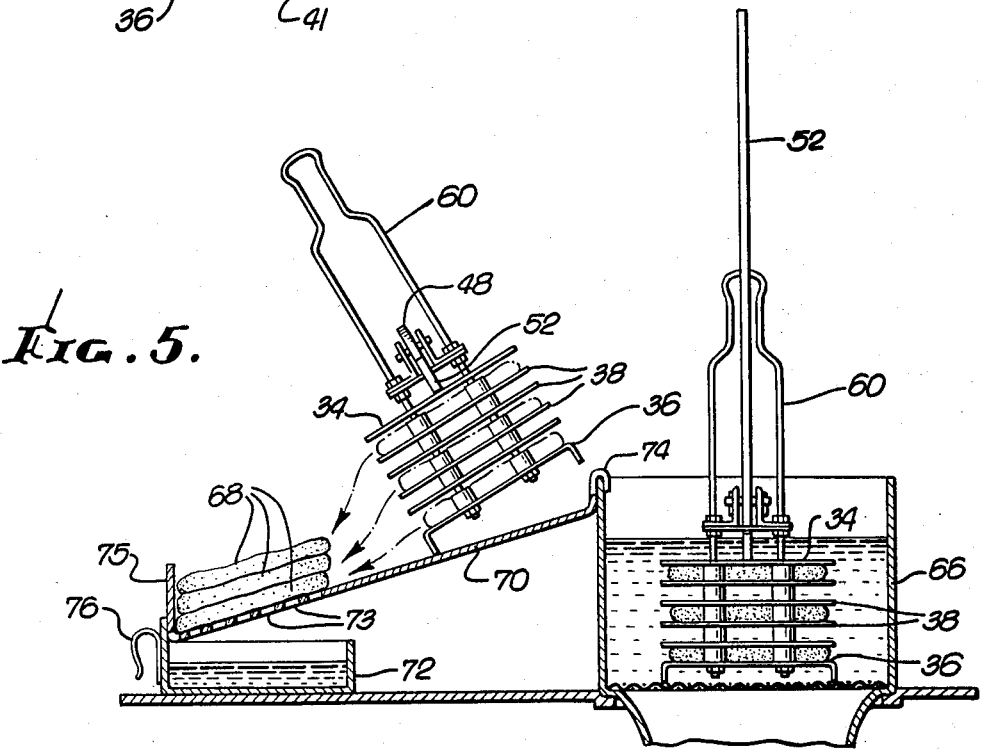

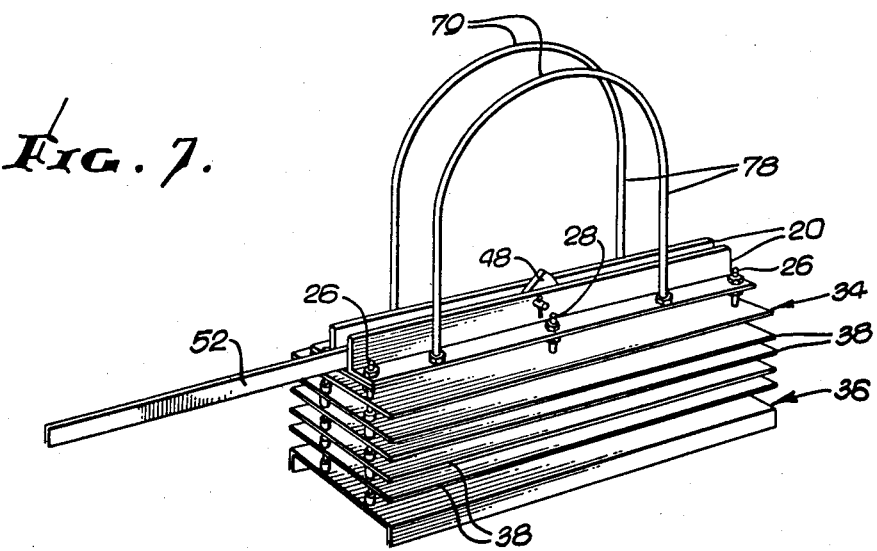

APPARATUS FOR COOKING MEAT PATTIES AND THE LIKE

CROSS-REFERENCES TO RELATED APPLICATIONS

This is a division of application Ser. No. 724,571 filed Sept. 20, 1976 now abandoned, which is a continuation of Ser. No. 624,583 filed Oct. 22, 1975 now abandoned.

This invention relates generally to meat cooking, and more specifically to meat patties and the like which are held between two heat transfer plates to compress the patties during cooking in a liquid heat medium such as cooking oil or fat.

Fast-food restaurants which feature hamburger sandwiches have been unable to satisfactorily solve the timing problem of cooking the meat patties. Under one system, the meat is cooked ahead of time prior to receiving the order, thus avoiding the problem of having a customer wait while his sandwich is prepared. Nevertheless, most people agree that a hamburger tastes the best when it is freshly cooked. This leads to the other system where cooking commences after receiving the order. However, the traditional cooking methods of frying or broiling take too long when done properly. Also, during cooking, the patties must be watched and tended in order to be turned at the right time. Also, when a backlog of orders develops the cook must keep track of the sequence in which the uncooked patties were placed on the grill, and must take care of each pattie individually.

A conveyor belt system has been developed for broiling a number of patties at the same time without having to tend or turn them, but it is expensive and takes up excessive space. Also, it still does not provide a short enough cooking time.

Also, the existing electrical home cookers for holding meat or sandwiches between two grill plates are not suitable for commercial use.

Accordingly, it is an object of the invention to provide an improved apparatus for cooking meat patties and the like which eliminates the need for excessive cooking time without detracting from the quality of the hamburger.

It is a further object of the invention to provide an apparatus for cooking several meat patties at the same time without having to individually handle and tend the meat during the cooking. A related object is to provide a self-supporting device for holding the patties during cooking which does not require attention until the cooking is completed.

Another object is to provide a cooking apparatus which eliminates the need for turning over the pattie, and which cooks both sides of the pattie simultaneously.

Another object is to provide apparatus which employs existing cooking facilities without having to design new and expensive cooking equipment.

Another object is to provide apparatus for cooking meat patties which is simple and can be understood and used by unskilled workers with only a short period of orientation and instruction being required.

More specifically, it is an object of the present invention to provide apparatus for cooking meat patties submerged in a deep-fat cooker. A related object is to provide apparatus of the aforementioned characteristics which speeds up the normal cooking time without drying out or over-cooking the outside of the pattie. Another related object is to expedite the heat transfer between the liquid heat source and the meat patties.

Another object is to provide apparatus for cooking a pattie in a deep-fat cooker without adulterating the cooking fat with undesirable liquids from the meat patty. A related object is to provide a cooked meat pattie which retains most of its juices and liquids.

Another object is to provide apparatus which compresses the meat patties before and/or during the cooking operation in the deep fat.

A further related object is to provide apparatus which prevents excess meat liquids from draining into the cooking fat, but which provides a way for draining off the excessive portions of said liquids before the pattie is placed in the sandwich.

Another object is to provide an apparatus which enables a person to cook either a single pattie or a large number of patties, all with the same apparatus.

Another object of the present invention is to provide a device for holding the patties during cooking which can be easily cleaned and sterilized without damaging its operative parts.

Another object is to provide a device with elongated plates for cooking a plurality of patties in a single layer. A related object is to provide a device having vertically spaced compartments which can be used to hold several layers of patties, with intermediate layers being kept open to allow the cooking fat to circulate therein and provide the heat source.

Further purposes, object, features and advantages of the invention will be evident to those skilled in the art from the following description of the various exemplary embodiments of the invention.

IN THE DRAWING

FIG. 1 is an isometric projection of a presently preferred embodiment of the device with opposing meat-holding plates in expanded open position;

FIG. 2 is a longitudinal cross-sectional view taken along the line 2—2 in FIG. 1 with uncooked meat patties in three alternate layers;

FIG. 3 is a transverse cross-sectional view taken along the line 3—3 in FIG. 2;

FIG. 4 is the same sectional view as FIG. 2 with the plates in contracted closed position to compress the uncooked meat patties;

FIG. 5 is a sectional view of a deep-fat cooker with an adjacent discharge platform positioned over a liquid receptacle showing one device in cooking position and another in unloading position;

FIG. 6 shows a second embodiment in a fragmentary transverse cross-sectional view with the plates in contracted closed position to snugly hold two alternate layers of uncooked meat patties and to compress them during cooking;

FIG. 7 shows a third embodiment in an isometric projection with an alternate handle construction.

Generally speaking, the invention provides apparatus for adapting the fast-cooking advantages of deep-fat cooking for use with meat patties and the like. In this regard, preliminary testing indicated that merely cooking a meat pattie immersed in the cooking fat was wholly unsatisfactory. The exemplary embodiments described hereinafter disclose the unique structures and steps which resulted from further experimentation and enabled the use of a conventional deep-fat cooker for accelerated high quality cooking of meat patties.

Referring to the embodiment of FIGS. 1-5, the apparatus of the exemplary form shown includes a frame comprising two longitudinal angle irons 20 having upwardly extending vertical flanges 22, two cross-bars 24, four end rods 26 and two middle rods 28. The end rods 26 constitute upright corner members which carry the angle irons 20 at the upper end of the rods. The cross-bars 24 hold the two angle irons apart from each other so that the vertical flanges form both sides of a long passage 29. The angle irons, end rods and cross-bars are all joined together by suitable fasteners 30, while the middle rods are joined to the angle irons by fasteners 31.

The meat-carrying portion of the apparatus includes a top plate 34, base plate 36 and four intermediate plates 38. Each of the plates includes a cooking face 39 and a heat receptor surface 40. The base plate includes two downwardly turned flanges 41 forming support legs for the device. All of the end rods 26 and middle rods 28 pass through the plates which overlie one another to form three alternate cooking compartments 42 and two interstitial heating compartments 43. The space above the top plate and below the base plate also form heating compartments although bounded on only one side by a heat transfer plate. The minimum spacing between the plates is determined by the heating spacers 44 and the cooking spacers 45 which are shown as cylindrical elements surrounding the rods between the plates. The cooking compartments are expanded to a normally open position by biasing springs 46 located inside the spacers in the cooking compartment and extending between each pair of opposing cooking faces 39.

The actuator for controlling the spacing of the heating compartments includes a cam 48, shaft 50, lever arm 52, and follower bar 54. The cam, located on one end of the lever arm, is mounted on the shaft which is seated between the vertical flanges 22. The peripheral edge of the cam includes a small diameter portion 55 connected through a curved portion 56 to a large diameter portion 57, all of which are engageable with and ride against the top edge of the follower bar 54 mounted above the top plate 34 by screws 58.

The angle irons 20 and their various attached elements are connected to a handle 60 by two legs 61 joined together by a brace 62 and fastened to the angle irons forwardly of the shaft 50, with the legs sufficiently separated to allow the lever arm to move between them.

The strength and stability of the device during lifting and manipulation is enhanced by the flanges 41 which preferably extend in the longitudinal direction of the base plate. The flanges also assure free circulation of the cooking fat adjacent the heat receptor surface of the base plate.

In this first-mentioned embodiment, the height of the cooking spacers 45 is less than the thickness of an uncooked meat patty 64, so that when the lever arm is moved in the direction shown by the arrow 65 the plates are contracted into a closed position as shown in FIG. 4, thus compressing the uncooked patties between the plates.

In the embodiment of FIG. 6, the relative thickness of the uncooked patties 64a and the cooking spacers 45 have been changed, such that the thickness of the cooking spacer corresponds to the natural thickness of the uncooked patty. In this embodiment, after the lever arm has been moved to a closed position to overcome the biasing springs, the compression occurs during the cooking process as the patty seeks to become thicker through normal expansion, but the plates compress the cooking patty to maintain its thickness the same as before. In this embodiment, a heating spacer 44a has a greater height than its adjacent cooking spacers, thus showing a possible variation which can be made, depending on the type of plates employed, and the type and thickness of the meat placed therebetween in the cooking compartment adjacent to such a heating compartment 43a.

Referring to FIG. 5 with the meat patties in position in the cooking compartments between the plates, and with the lever arm moved so as to rotate the cam to a first position with the large diameter portion of the cam pushing down the follower bar 54, the plates and the meat patties therebetween are squeezed together before the frame is inserted in a deep fat cooker 66 with the level of the fat above the top plate 34.

The illustrated components for unloading cooked meat patties 68 are also shown in FIG. 5 and include a discharge plate 70 and a liquid receptacle 72 located under aperture 73 in the discharge plate. The discharge plate has a lip 74 at its upper end which fits over the edge of the cooker, and extends downwardly to its lower end having the aperture 73 as well as an upturned flange 75 to prevent overflow of any liquids draining from the patties. The receptacle may include a handle 76 for carrying the liquid receptacle when it is filled with the meat juices and liquids.

Referring to the embodiment of FIG. 7, a modified handle 78 formed by two inverted U shaped members is shown attached to the angle irons 20, thus providing a grip 79 which is located generally above the center of gravity of the unit facilitating the movement of the unit in and out of the cooker, and a passage is still provided in the handle to allow back and forth movement of the lever arm 52.

By employing the afore-mentioned features of the invention, it has been found possible to cook meat patties having an initial uncooked thickness of about ⅜ inch in about one minute and ten seconds in cooking fat of about 340–360 degrees Fahrenheit without losing their juices into the surrounding fat, and without detracting from the various characteristics which create a desirable hamburger patty for eating alone or in a sandwich. By varying the thickness and material of the plates, the temperature of the cooking fat and the thickness of the cooking compartments relative to the meat pattie thickness, it is possible to optimize the quality and efficiency of cooking large numbers of meat patties in accordance with a predetermined time schedule.

Although exemplary embodiments of the invention have been disclosed and discussed, it will be understood that other applications of the invention are possible and that the embodiements may be subjected to various changes, modification, and substitutions without necessarily departing from the invention.

I claim as my invention:

1. A device for cooking meat patties and the like in a deep-fat cooker, including in combination:

a frame having an arm connected thereto;
vertical rod means mounted on said frame;
plate means carried on said rod means and comprising horizontal plate members for defining a plurality of interstitial cooking compartments to hold meat patties and vertically spaced-apart heating compartments above and below each interstitial cooking compartment to receive the hot cooking fat;
actuating means coupled between said arm and said plate means to vertically enlarge each of the interstitial cooking compartments when said arm is moved to a second position and to vertically contract each of the interstitial cooking compartments when said arm is moved to a first position; and spring biasing means engaging each of the plate members for allowing the aforementioned vertical enlargement and contraction of the interstitial cooking compartments without changing the vertical spacing in the heating compartments.

2. The device of claim 1 wherein each of said plate members includes a cooking face forming a boundary for its adjacent cooking compartment and an oppositely directed heat receptor surface forming a boundary for its adjacent heating compartment, and wherein said spring biasing means includes first spacer means in the heating compartment extending between and spacing apart the heat receptor surfaces a first predetermined distance and a normally expanded spring in the cooking compartment extending between the cooking faces.

3. The device of claim 2 wherein said spring biasing means includes second spacer means in the cooking compartment extending between and spacing apart the cooking faces a second predetermined distance when said arm is in said first position.

4. The device of claim 3 wherein said first and second spacer means are differently sized to form a first predetermined distance which is different from said second predetermined distance.

5. The device of claim 1 wherein said plates are elongated, and wherein said rod means includes central rod means located intermediate of end rod means to form horizontally spaced-apart sections for holding two or more meat patties in each cooking compartment.

6. The device of claim 1 including a handle fixedly connected to said frame.

7. The device of claim 1 wherein the portion of said plates forming the cooking compartments are without perforations.

8. A device for cooking meat patties and the like in a deep-fat cooker, including in combination:
a frame;
vertical rod means mounted on said frame;
plate means carried on said rod means and comprising horizontal plate member for defining a plurality of interstitial cooking compartments to hold meat patties and vertically spaced-apart heating compartments above and below each interstitial cooking compartment to receive the hot cooking fat, each of said plate members including a cooking face forming a boundary for its adjacent cooking compartment and an oppositely directed heat receptor surface forming a boundary for its adjacent heating compartment;

an arm connected to said frame said arm being shiftable from a first position to a second position; a handle on said frame fixedly connected to said vertical rod means;

actuating means coupled between said arm and said plate means to vertically enlarge each of the interstitial cooking compartments when said arm is moved to a second position and to vertically contract each of the interstitial cooking compartments when said arm is moved to a first position; and spring biasing means engaging each of the plate members for allowing the aforementioned vertical enlargement and contraction of the interstitial cooking compartments without changing the vertical spacing in the heating compartments, including first spacer means in the heating compartment extending between and spacing apart the heat receptor surfaces a first predetermined distance when said arm is in both first and second positions, second spacer means in the cooking compartment extending between and spacing apart the cooking faces a second predetermined distance when said arm is in said first position, and a normally expanded spring in the cooking compartment for holding apart the cooking faces a third predetermined distance when said arm is in siad second position.

9. The device of claim 8, wherein said plate means includes a bottom plate member having downwardly extending flange means along its periphery to form a support base for the device and for spacing apart the heat receptor surface of said bottom plate from the cooker bottom a fourth predetermined distance to define a heat compartment between the cooker bottom and said bottom plate.

10. The device of claim 8 wherein said cooking faces of said plate members are without perforations.

* * * * *